United States Patent
Kapadia et al.

(10) Patent No.: US 8,965,820 B2
(45) Date of Patent: Feb. 24, 2015

(54) MULTIVARIATE TRANSACTION CLASSIFICATION

(75) Inventors: Vishal Kapadia, Suwanee, GA (US); John Jensen, Madison, CT (US); Geralyn McBride, Vergennes, VT (US); Jagan Sundaramoothy, Bangalore (IN); Raghavendra Deshmukh, Bangalore (IN); Piyush Sacheti, Banagalore (IN); Chandrashekar Althati, Bangalore (IN)

(73) Assignee: SAP SE, Walldorf (DE)

( * ) Notice: Subject to any disclaimer, the term of this patent is extended or adjusted under 35 U.S.C. 154(b) by 304 days.

(21) Appl. No.: 13/602,706

(22) Filed: Sep. 4, 2012

(65) Prior Publication Data

US 2014/0067737 A1    Mar. 6, 2014

(51) Int. Cl.
*G06F 15/18* (2006.01)
*G06N 5/02* (2006.01)

(52) U.S. Cl.
USPC ............................................. 706/20; 706/47

(58) Field of Classification Search
USPC ...................................................... 706/20, 47
See application file for complete search history.

(56) References Cited

U.S. PATENT DOCUMENTS

| | | |
|---|---|---|
| 6,662,190 B2 | 12/2003 | Bax et al. |
| 6,714,939 B2 | 3/2004 | Saldanha et al. |
| 6,920,459 B2 | 7/2005 | Dedhia et al. |
| 7,165,068 B2 | 1/2007 | Dedhia et al. |
| 7,324,936 B2 | 1/2008 | Saldanha et al. |
| 7,672,877 B1 | 3/2010 | Acton et al. |
| 7,689,906 B2 | 3/2010 | Bax et al. |
| 7,870,039 B1 | 1/2011 | Dom et al. |
| 7,885,859 B2 | 2/2011 | Dom et al. |
| 8,010,375 B2 | 8/2011 | Herter et al. |
| 2009/0222365 A1* | 9/2009 | McGlynn et al. ............... 705/30 |

OTHER PUBLICATIONS

Volker et al., Statistical Schema Induction [online], 2011 [retrieved on Aug. 27, 2014]. Retrieved from the Internet:<URL:http://www.google.com/url?sa=t&rct=j&q=&esrc=s&frm=1&source=web&cd=1&ved=0CCAQFjAA&url=http%3A%2F%2Fwww.matlog.net%2Fpdfs.ps%2Feswc2011.pdf&ei=9nL9U9jXDfPKsQS-rlDoCg&usg=AFQjCNFXPoT7eAXtCanA1yTFHgsreEk6kQ&bvm=bv.74035653,d.cWc.ps>.*

Author unknown, article entitled "Analytics—Case Study—Global Entertainment Industry", Jun. 2004.

(Continued)

*Primary Examiner* — Jeffrey A Gaffin
*Assistant Examiner* — Nathan Brown, Jr.
(74) *Attorney, Agent, or Firm* — Fountainhead Law Group PC

(57) ABSTRACT

Embodiments relate to classification of transactions based upon analysis of multiple variables. For a purchase transaction, such variables can include but are not limited to: buying location, source system, line of business, cost center, functional area, supplier capabilities, item description, account description, organization, department, custom parameters, and others. Embodiments may rely upon one or more classification schemes, such as statistical classification, semantic classification, and/or knowledge base classification, taken alone or in combination. In a purchase transaction, classification based on multivariate analysis facilitates identification of a purchased item or service, and hence accuracy in classifying and assigning a central classification code. Particular embodiments may include a feature allowing user review/revision of category assignments via a feedback loop linked to past classification. This revision feature may add clarity to a current transaction, allow modification of future classification for ongoing improvement, and provide a user-driven measure of system performance.

14 Claims, 19 Drawing Sheets

(56) References Cited

OTHER PUBLICATIONS

Author unknown, article entitled "Analytics—Case Study—Oil & Gas Industry", Jun. 2004.
Author unknown, article entitled "Case Study—Water Treatment Industry," Feb. 2009.
Declaration of Vishal Kapadia, dated Oct. 14, 2014.
Document entitled "Spend Classification", Version 7.0, pp. 1-48, dated Oct. 28, 2009.

* cited by examiner

| SEM_RULE | SEM_CF | SEM_CODE | KB_RULE | KB_CF | KB_CODE | CLASSIFICA-TION_CODE | CLASSIFICATION_DESCRIPTION | CLASSIFI-CATION_CF | CLASSIFICA-TION_RULE |
|---|---|---|---|---|---|---|---|---|---|
| Sem7 | 0.094 | 1066358 | KB3 | 0.957 | 1069262 | 1066358 | Water Service | 0.094 | Sem7 |
| Sem1 | 0.559 | 1069262 | KB3 | 0.884 | 1069262 | 1069262 | Sportswear | 0.559 | Sem1 |
| Sem8 | 0.241 | 1067926 | KB3 | 1 | 1066187 | 1067926 | Office Supplies | 0.241 | Sem8 |
| Sem9 | 0.164 | 1063440 | KB3 | 1 | 1066213 | 1063440 | Education | 0.164 | Sem9 |
| Sem5 | 0.114 | 66773 | KB4 | 0.556 | 1068521 | 66773 | Batteries | 0.114 | Sem5 |
| Sem3 | 0.314 | 1066356 | KB4 | 0.556 | 1068521 | 1066356 | Electric Service | 0.314 | Sem3 |
| Sem4 | 0.136 | 1066372 | KB4 | 0.556 | 1068521 | 81490 | Fabric | 0.371 | Sem2 |
| Sem7 | 0.094 | 1066358 | KB2 | 0.567 | 1066836 | 1066836 | Water Service | 0.567 | KB2 |
| Sem6 | 0.111 | 1066109 | KB1 | 1 | 60446 | 60446 | Medical Services | 1 | KB1 |
| Sem2 | 0.371 | 81490 | KB3 | 1 | 1069230 | 81490 | Fabric | 0.371 | Sem2 |

| Rule Number | Priority | Column_Names |
|---|---|---|
| STAT1 | 1 | SUPPL,ACCT,ITEM,CATEGORY |
| STAT2 | 2 | SUPPL,ACCT,ITEM |
| STAT3 | 3 | SUPPL,ACCT,CATEGORY |
| STAT4 | 4 | ACCT,ITEM,CATEGORY |
| STAT5 | 5 | SUPPL,ACCT |
| STAT6 | 6 | SUPPL,ITEM |
| STAT7 | 7 | SUPPL,ACCT |
| STAT8 | 8 | SUPPL |

| Priority | Column_Names | Rule_Desc | Rule Number | CONFIDENCE_FACTOR | Sem_Code |
|---|---|---|---|---|---|
| 1 | SUPPL | like '% painting%' | Sem10 | 0.242 | 1066286 |
| 2 | ACCT | like '% apparel%' | Sem11 | 0.027 | 1068028 |
| 3 | SUPPL,ACCT | like '% training%' | Sem9 | 0.164 | 1063440 |
| 4 | SUPPL,ACCT,ITEM | like '% office%' , '% sup%' | Sem8 | 0.241 | 1067926 |
| 5 | SUPPL,ACCT,ITEM,CATEGORY | like '% sport%' , '% apparel%' | Sem1 | 0.559 | 1069262 |
| 6 | SUPPL,ACCT,ITEM,CATEGORY | like '% fabrics%' | Sem2 | 0.371 | 81490 |
| 7 | SUPPL,ACCT,ITEM,CATEGORY | like '% power%' | Sem3 | 0.314 | 1066356 |
| 8 | SUPPL,ACCT,ITEM,CATEGORY | like '% housing%' | Sem4 | 0.136 | 1066372 |
| 9 | SUPPL,ACCT,ITEM,CATEGORY | like '% battery%' | Sem5 | 0.114 | 66773 |
| 10 | SUPPL,ACCT,ITEM,CATEGORY | like '% medical%' | Sem6 | 0.111 | 1066109 |
| 11 | SUPPL,ACCT,ITEM,CATEGORY | like '% water%' and not like '% bott%' | Sem7 | 0.094 | 1066358 |

FIG. 3C

| Rule Number | Priority | Column_Names |
|---|---|---|
| KB1 | 1 | SUPPL,ACCT,ITEM,CATEGORY |
| KB2 | 2 | SUPPL,ACCT,ITEM |
| KB3 | 3 | SUPPL,ACCT,CATEGORY |
| KB4 | 4 | SUPPL |

FIG. 3DA

| PKEY | SUPPL | ACCT | ITEM | CATEGORY | KB_CODE | KB_CF |
|---|---|---|---|---|---|---|
| 1 | Comp A | Finished Goods | Waterproof JKT | Golf Apparel | 1069262 | 0.957 |
| 2 | Comp B | Finished Goods | Mens Microfiber Jacket | Golf Apparel | 1069262 | 0.884 |
| 3 | Comp I | Apparel/Accessories | Not Assign | CGC/Hogan Club | 67469 | 0.8 |
| 4 | Comp J | Serv./Maint. Contracts | Not Assign | CGC/Hogan Club | 1066286 | 0.714 |
| 5 | Comp K | Due From Canada-Other | Not Assign | CGC/Hogan Club | 1066359 | 0.636 |
| 6 | Comp L | Domestic Shipping | Not Assign | NULL | 1066178 | 1 |
| 7 | Comp C | Parts, Supp | Not Assign | CGC/Hogan Club | 1066187 | 1 |
| 8 | Comp D | Training, Seminars | Not Assign | CGC/Hogan Club | 1066213 | 1 |
| 9 | Comp E | Inc. Boa 2468 | NULL | Raw Components | 1068521 | 0.556 |
| 10 | Comp E | Inc. Boa 2468 | NULL | NULL | 1068521 | 0.556 |
| 11 | Comp E | Inc. Boa 2468 | NULL | Raw Fabrics | 1068521 | 0.556 |
| 12 | Comp F | AP- PNC | Diamond Crystal Pellet | Services Landscpng | 1066836 | 0.567 |
| 13 | Comp G | Inc. Boa 2468 | Lower Leg Cuff | Orth Surg. | 60446 | 1 |
| 14 | Comp H | Bofa Achs | Stockings | Orth Surg. | 1069230 | 1 |

FIG. 3DB

| Rule Number | Rule | Max_CF | Min_CF | Classification_Type |
|---|---|---|---|---|
| 1 | Stat1 | 1 | 0.8 | STAT |
| 2 | Stat2 | 1 | -1 | STAT |
| 3 | Stat3 | 1 | 0.9 | STAT |
| 4 | Stat4 | 1 | -1 | STAT |
| 5 | Stat1 | 0.8 | -1 | STAT |
| 6 | Stat5 | 1 | -1 | STAT |
| 7 | Sem1 | 1 | 0.5 | SEM |
| 8 | Sem2 | 1 | -1 | SEM |
| 9 | Sem7 | 1 | 0.09 | SEM |
| 10 | Sem4 | 0.5 | -1 | SEM |
| 11 | Sem3 | 1 | 0.7 | SEM |
| 12 | KB2 | 1 | -1 | KB |
| 13 | KB1 | 1 | -1 | KB |
| 14 | Sem6 | 1 | -1 | SEM |
| 15 | Sem5 | 1 | 0.8 | SEM |
| 16 | Sem8 | 1 | -1 | SEM |
| 17 | Sem9 | 1 | -1 | SEM |
| 18 | KB3 | 1 | 0.8 | KB |

FIG. 3E

| PKEY | SUPPL | ACCT | ITEM | CATEGORY | CLASSIFICATION_CODE | CLASSIFICATION_DESCRIPTION | CLASSIFICATION_CF | CLASSIFICATION_RULE |
|---|---|---|---|---|---|---|---|---|
| 1 | Comp A | Finished Goods | Waterproof JKT | Golf Apparel | 1066358 | Water Service | 0.094 | Sem7 |
| 2 | Comp B | Finished Goods | Mens Microfiber Jacket | Golf Apparel | 1069262 | Sportswear | 0.559 | Sem1 |
| 3 | Comp C | Parts, Supp | Not Assign | CGC/Hogan Club | 1067926 | Office Supplies | 0.241 | Sem8 |
| 4 | Comp D | Training, Seminars | Not Assign | CGC/Hogan Club | 1063440 | Education | 0.164 | Sem9 |
| 5 | Comp E | Inc. Boa 2468 | Battery Plate | Raw Component Fabricated | 66773 | Batteries | 0.114 | Sem5 |
| 6 | Comp E | Inc. Boa 2468 | Case Power Supply | Cases | 1066356 | Electric Service | 0.314 | Sem3 |
| 7 | Comp E | Inc. Boa 2468 | House Wiring Battery | Raw Fabrics | 81490 | Fabric | 0.371 | Sem2 |
| 8 | Comp F | AP- PNC | Diamond Crystal Pellet | Services Lndscping | 1066836 | Water Service | 0.567 | KB2 |
| 9 | Comp G | Inc. Boa 2468 | Lower Leg Cuff | Orth Surg. | 60446 | Medical Services | 1 | KB1 |
| 10 | Comp H | Bofa Achs | Stockings | Orth Surg. | 81490 | Fabric | 0.371 | d |

TAXONOMY

| TAXONOMYID | CLASSIFICATION_CODE | CODE | CODEPAR | Level | Description |
|---|---|---|---|---|---|
| UNSPSCv11 | 66773 | 66773 | 26.11.17.00 | 5 | Batteries |
|  | 1062714 | 26.11.17.00 | 26.11.17 | 4 | Batteries and cells |
|  | 1062715 | 26.11.17 | 26.11 | 3 | Batteries and cells and accessories |
|  | 1062710 | 26.11 | 26 | 2 | Batteries and generators and kinetic power transmission |
|  | 1062704 | 26 |  | 1 | Power Generation and Distribution Machinery and Accessories |
|  | 1066372 | 1066372 | 90.11.15.02 | 5 | Lodging |
|  | 56144 | 90.11.15.02 | 90.11.15 | 4 | Lodges or resorts |
|  | 1063787 | 90.11.15 | 90.11 | 3 | Hotels and motels and inns |
|  | 1063448 | 90.11 | 90 | 2 | Hotels and lodging and meeting facilities |
|  | 1063446 | 90 |  | 1 | Travel and Food and Lodging and Entertainment Services |
| SAP | 66773 | 66773 | 61300000 | 4 | Batteries |
|  | 66773 | 61300000 | 6130 | 3 | Batteries Case |
|  | 66773 | 6130 | 61 | 2 | Batteries Case & Components |
|  | 60443 | 61 |  | 1 | Electric Wire & Power & Distribution Equipment |
|  | 1066372 | 1066372 | 9300000 | 4 | Lodging |
|  | 1066372 | 9300000 | 930 | 3 | Lodging |
|  | 1066372 | 930 | 9 | 2 | Lodging |
|  | 1066363 | 9 |  | 1 | Travel, Transportation, Lodging & Meals |

| PKEY | SUPPL | ACCT | ITEM | CATEGORY | CLASSIFICATION_CODE | CLASSIFICATION_DESCRIPTION | CLASSIFICATION_CF | CLASSIFICATION_RULE |
|---|---|---|---|---|---|---|---|---|
| 1 | Comp A | Finished Goods | Waterproof JKT | Golf Apparel | 1066358 | Water Service | 0.094 | Sem7 |
| 2 | Comp B | Finished Goods | Mens Microfiber Jacket | Golf Apparel | 1069262 | Sportswear | 0.559 | Sem1 |
| 3 | Comp C | Parts, Supp | Not Assign | CGC/Hogan Club | 1067926 | Office Supplies | 0.241 | Sem8 |
| 4 | Comp D | Training, Seminars | Not Assign | CGC/Hogan Club | 1063440 | Education | 0.164 | Sem9 |
| 5 | Comp E | Inc. Boa 2468 | Battery Plate | Raw Component Fabricated | 66773 | Batteries | 0.114 | Sem5 |
| 6 | Comp E | Inc. Boa 2468 | Case Power Supply | Cases | 1066356 | Electric Service | 0.314 | Sem3 |
| 7 | Comp E | Inc. Boa 2468 | House Wiring Battery | Raw Fabrics | 66773 | Batteries | 1 | Manual |
| 8 | Comp F | AP- PNC | Diamond Crystal Pellet | Services Lndscping | 1066836 | Water Service | 0.567 | KB2 |
| 9 | Comp G | Inc. Boa 2468 | Lower Leg Cuff | Orth Surg. | 60446 | Medical Services | 1 | KB1 |
| 10 | Comp H | Bofa Achs | Stockings | Orth Surg. | 81490 | Fabric | 0.371 | Sem2 |

TAXONOMY

| TAXONOMYID | CLASSIFICATION CODE | CODE | CODEPAR | Level | Description |
|---|---|---|---|---|---|
| UNSPSCv11 | 66773 | 66773 | 26.11.17.00 | 5 | Batteries |
| | 1062714 | 26.11.17.00 | 26.11.17 | 4 | Batteries and cells |
| | 1062715 | 26.11.17 | 26.11 | 3 | Batteries and cells and accessories |
| | 1062710 | 26.11 | 26 | 2 | Batteries and generators and kinetic power transmission |
| | 1062704 | 26 | 26 | 1 | Power Generation and Distribution Machinery and Accessories |
| | 1066372 | 1066372 | 90.11.15.02 | 5 | Lodging |
| | 56144 | 90.11.15.02 | 90.11.15 | 4 | Lodges or resorts |
| | 1063787 | 90.11.15 | 90.11 | 3 | Hotels and motels and inns |
| | 1063448 | 90.11 | 90 | 2 | Hotels and lodging and meeting facilities |
| | 1063446 | 90 | 90 | 1 | Travel and Food and Lodging and Entertainment Services |
| SAP | 66773 | 66773 | 6130000 | 4 | Batteries |
| | 1066372 | 6130000 | 6130 | 3 | Batteries Case |
| | 1066372 | 6130 | 61 | 2 | Batteries Case & Components |
| | 60443 | 61 | 61 | 1 | Electric Wire & Power & Distribution Equipment |
| | 1066372 | 1066372 | 9300000 | 4 | Lodging |
| | 1066372 | 9300000 | 930 | 3 | Lodging |
| | 1066372 | 930 | 9 | 2 | Lodging |
| | 1066363 | 9 | 9 | 1 | Travel, Transportation, Lodging & Meals |

UNSPSC

▸ 📁 26, Power Generation and Distribution Machinery and Accessories
  ▸ 📁 26.11, Batteries and generators and kinetic power transmission
    ▸ 📁 26.11.17, Batteries and cells and accessories
      ▸ 📁 26.11.17.00 Batteries and cells
        ▸ 📁 66773, Batteries

| 📄 | | | |
|---|---|---|---|
| 5:Comp E | Inc. Boa 2468 | Battery Plate:Raw Component Fabricated | 66773 Batteries |
| 7:Comp E | Inc. Boa 2468 | House Wiring Battery | Raw Fabrics | 66773 Batteries |

SAP

▸ 📁 61, Electric Wire & Power & Distribution Equipment
  ▸ 📁 6130, Batteries Case & Component
    ▸ 📁 61300000, Batteries Case
      ▸ 📁 66773, Batteries

| 📄 | | | |
|---|---|---|---|
| 5:Comp E | Inc. Boa 2468 | Battery Plate:Raw Component Fabricated | 66773 Batteries |
| 7:Comp E | Inc. Boa 2468 | House Wiring Battery | Raw Fabrics | 66773 Batteries |

FIG. 5AB

| PKEY | SUPPL | ACCT | ITEM | CATEGORY | CLASSIFICATION CODE | CLASSIFICATION DESCRIPTION | CLASSIFICATION_CF | CLASSIFICATION_RULE |
|---|---|---|---|---|---|---|---|---|
| 1 | Comp A | Finished Goods-Purchased | Waterproof JKT | Golf Apparel | 1066358 -> 1069262 | Water Service -> Sportswear/Athletic Clothing | 0.094 -> 1 | Sem7 -> Manual |
| 2 | Comp B | Finished Goods-Purchased | Mens Microfiber Jacket | Golf Apparel | 1069262 | Sportswear/Athletic Clothing | 0.241 | Sem1 |
| 3 | Comp C | Parts, Supp & Office Supplies | Not Assign | CGC/Hogan Club P Org | 1067926 | General Office Supplies | 0.241 | Sem8 |
| 4 | Comp D | Training, Seminars & Conferences | Not Assign | CGC/Hogan Club P Org | 1063440 | Education and Training Services | 0.164 | Sem9 |
| 5 | Comp E | Inc. Boa 2468 | Battery Plate | Raw Components Fabricated | 66773 | Batteries | 0.114 | Sem5 |
| 6 | Comp E | Inc. Boa 2468 | Case Bottom Power Supply | Cases | 1066356 | Electric Service | 0.314 | Sem3 |
| 7 | Comp E | Inc. Boa 2468 | House Wiring battery | Raw Fabrics | 81490 -> 66773 | Fabric -> Batteries | 0.371 -> 1 | Sem2 -> Manual |
| 8 | Comp F | AP- PNC | Diamond Crystal Pellet | Services. Landscpng | 1066836 | Water Service | 0.567 | KB2 |
| 9 | Comp G | Inc. Boa 2468 | Lower Leg Cuff | Orth Surg. FGP | 60446 | Medical Services | 1 | KB1 |
| 10 | Comp H | Bofa Achs | Stockings | Orth Surg. FGP | 81490 -> 60446 | Fabric -> Medical Services | 0.371 -> 1 | Sem2 -> Manual |

FIG. 5B

| SEM_RULE | SEM_CF | SEM_CODE | KB_RULE | KB_CF | KB_CODE | CLASSIFICA-TION_CODE | CLASSIFICATION_DESCRIPTION | CLASSIFICA-TION_CF | CLASSIFICA-TION_RULE |
|---|---|---|---|---|---|---|---|---|---|
| Sem5 | 0.114 | 66773 | KB4 | 0.556 | 1068521 | 66773 | Batteries | 0.114 | Sem5 |
| Sem3 | 0.314 | 1066356 | KB4 | 0.556 | 1068521 | 1066356 | Electric Service | 0.314 | Sem3 |
| Sem4 | 0.136 | 1066372 | KB4 | 0.556 | 1068521 | 81490/66773 | Fabric / Batteries | 0.371 / 1 | Sem2 / Manual |
| Sem2 | 0.371 | 81490 | KB3 | 1 | 1069230 | 81490/60446 | Fabrics / Medical Service | 0.371 / 1 | Sem2 / Manual |
| Sem11 | 0.027 | 1068028 | KB3 | 0.8 | 67469 | 1068028 | Clothing, Individual Equip | 0.027 | Sem11 |
| Sem5 | 0.559 | 1069262 | KB3 | 0.884 | 1069262 | 66773 | Batteries | 0.666 | STAT7 |
| Sem2 | 0.027 | 1068028 | KB3 | 0.957 | 1069262 | 60446 | Medical Services | 1 | STAT1 |

FIG. 6AB

| □ Packaging | □ Telecom |
| $643,000 | $357,000 |

FIG. 7A

| □Cell Phones | □ Displays | □ Unknown |
| $72,000 | $513,000 | $415,000 |

FIG. 7B

| □Advertising | □ Unknown | □Office Sup. | |
| $130,000 | $475,000 | $72,000 | □ Utilities |
| □Freight | | | $285,000 |
| $38,000 | | | |

FIG. 7C

| Displays | Telecom PTP | Graphic Design | Freight $38,000 |
| $475,000 | $285,000 | $130,000 | Cell Phones $72,000 |

FIG. 7D

MULTIVARIATE TRANSACTION CLASSIFICATION

BACKGROUND

Embodiments of the present invention relate to classification of transactions, and in particular, to systems and methods employing multivariate transaction classification.

Unless otherwise indicated herein, the approaches described in this section are not prior art to the claims in this application and are not admitted to be prior art by inclusion in this section.

Classification is the process of assigning a classification code in one or more taxonomies to a transaction. One example of a taxonomy is the United Nations Standard Products and Services Code (UNSPSC). Such a taxonomy may also provide a framework for categorizing spending within an organization and performing analytics thereon.

The classification process may involve organizing transactions (such as invoices and purchase orders) by business dimensions and their hierarchy, in order to ensure a consistent and complete understanding of purchasing activity. This provides responsible parties (e.g. sourcing managers, Chief Procurement Officers) with visibility and accurate answers to questions regarding organizational spending.

Lack of a uniform classification structure defined across all procurement, financial transaction systems and other business data can interfere with effective analysis of category spending over the enterprise as a whole. Conventionally, organizations may address this issue through use of a 'single variable' approach for specific domains and their classification. An example of such an approach is exclusive use of an item description for spend classification.

Such single variable approaches are simple, but may lead to inaccuracy. For example, exclusive reliance upon item description for spending classification tend to cover direct spend but may miss leverage because of omission of item descriptions in indirect spending.

Similarly, basing classification solely upon the general ledger (G/L) account may result in a bias toward 'why' something was purchased, instead of 'what' was actually purchased. Lastly, classification by supplier only may result in an oversimplification because suppliers tend to sell more than one thing. As a result, alternative leverage such as consolidated shipping and services may remain unseen and unleveraged.

Accordingly, the present disclosure addresses these and other issues with systems and methods employing multivariate classification of transactions.

SUMMARY

Embodiments relate to classification of transactions based upon analysis of multiple variables. For a purchase transaction, such variables can include but are not limited to: buying location, source system, line of business, cost center, functional area, supplier capabilities, item description, account description, organization, department, custom parameters, and others. Embodiments may rely upon one or more classification methodologies such as statistical or baysein analyses of historical transactions, semantic analyses of multiple concurrent variables vis a vis current and historical processing, and self generating heuristics driven by multivariate analysis of evolving data content. In a purchase transaction, classification based on multivariate analysis facilitates identification of a purchased item or service, and hence accuracy in classifying and assigning a central classification code. Particular embodiments may include a feature allowing user review/revision of category assignments via a feedback loop linked to past classification. Revision tools are generic capabilities permitting the user to apply dynamic modification to the data which inherently modifies the multivariate heuristic approach, allowing modification of future classification for ongoing improvement, and providing a user-driven measure of system performance.

An embodiment of a computer-implemented method comprises causing a classification engine to receive unclassified data comprising a first variable and a second variable of a purchase transaction, causing the classification engine to reference a first ruleset to generate a first classification based upon the first variable, the second variable, and a rule of the first ruleset, and causing the classification engine to communicate the first classification to a user.

An embodiment of a non-transitory computer readable storage medium embodies a computer program for performing a method comprising causing a classification engine to receive unclassified data comprising a first variable and a second variable of a purchase transaction, causing the classification engine to reference a first ruleset to generate a first classification based upon the first variable, the second variable, and a rule of the first ruleset, and causing the classification engine to communicate the first classification to a user.

A computer system comprises one or more processors and a software program, executable on said computer system. The software program is configured to cause a classification engine to receive unclassified data comprising a first variable and a second variable of a purchase transaction, and to cause the classification engine to reference a first ruleset to generate a first classification based upon the first variable, the second variable, and a rule of the first ruleset. The software program is further configured to cause the classification engine to communicate the first classification to a user.

Certain embodiments further comprise causing the classification engine to reference a second ruleset to generate a second classification based on the first variable, the second variable, and a rule of the second ruleset, and causing the classification engine to determine that a confidence factor of the second classification is lower than a confidence factor of the first classification.

In some embodiments the first ruleset reflects a statistical classification scheme.

In particular embodiments the first ruleset reflects a semantic classification scheme or a knowledge base classification scheme.

According to various embodiments the first variable comprises buying location, source system, line of business, cost center, functional area, supplier capabilities, item description, account description, organization, or department.

Some embodiments further comprise revising the first classification based upon feedback from review by the user.

In certain embodiments the first classification is from a public taxonomy.

The following detailed description and accompanying drawings provide a better understanding of the nature and advantages of particular embodiments.

BRIEF DESCRIPTION OF THE DRAWINGS

FIG. 3B shows an example of a statistical classification ruleset.

FIG. 3C shows an example of a semantic classification ruleset.

FIG. 3DA shows an example of a knowledge base classification ruleset.

FIG. 3DB shows an example of a knowledge base database.

FIG. 3E shows an example of a final classification ruleset.

FIGS. 5AA-5AB show an example of manual change of a classification from user review.

FIG. 5B shows a detailed view of the classification change of FIGS. 5AA-AB.

FIGS. 7A-7D show the result of applying different classification approaches to the same purchase transaction.

DETAILED DESCRIPTION

Described herein are techniques for multivariate transaction classification. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
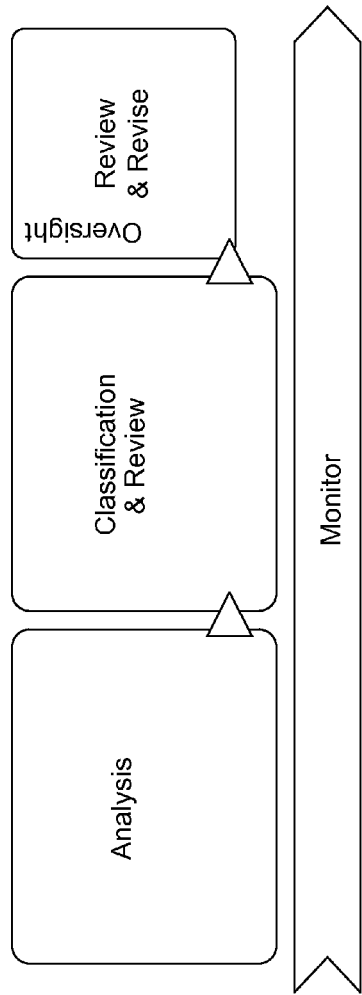
FIG. 1A is a simplified diagram showing the role of transaction classification in monitoring spending behavior within an organization.

FIG. 1A is a simplified diagram showing the role of transaction classification in monitoring spending behavior within an organization. In particular, responsible parties such as sourcing managers and Chief Procurement Officers desire to perform analysis to acquire visibility into purchasing transactions, and thereby provide accurate answers to questions regarding organizational spending.

In order to perform this task accurately, it is helpful to be able to classify various purchase transactions according in a taxonomy, and to allow review of that transaction classification. As discussed in detail below, embodiments allow oversight of a multivariable transaction classification process, including review of classification results and revision thereof.

Figure 1B:
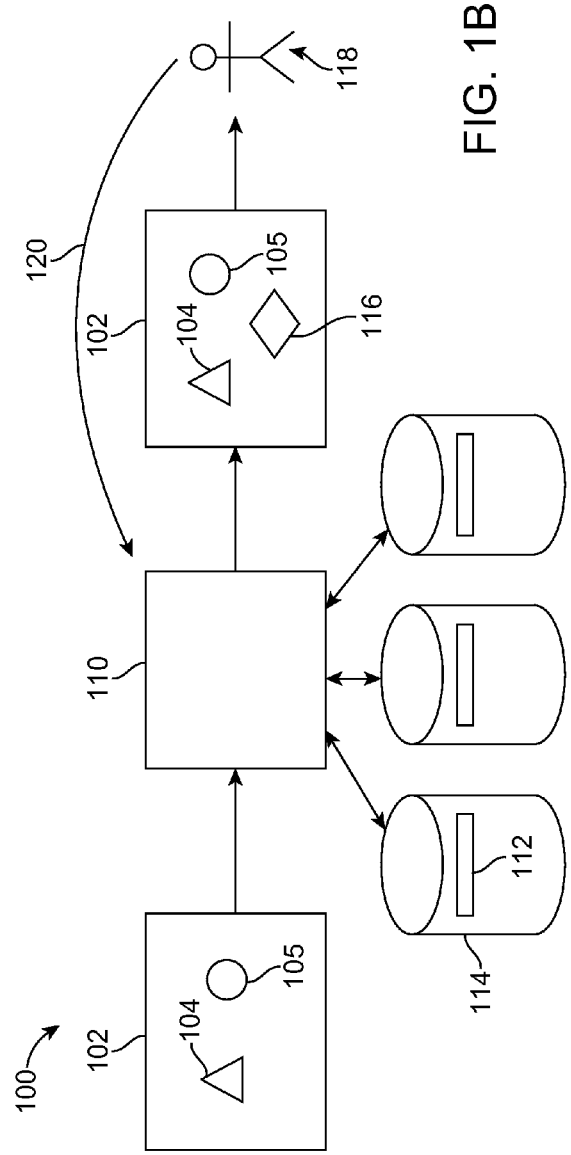
FIG. 1B is a simplified diagram showing an overview of a system performing classification according to an embodiment.

FIG. 1B is a simplified diagram showing an overview of a system configured to perform classification according to an embodiment. In particular, system 100 is configured to receive unclassified transaction data 102 from a transaction, for example a purchase transaction. This unclassified transaction data comprises at least two variables 104, 105. As only an example, in the context of a purchase transaction, the variable 104 could comprise an item description, and the second variable 105 could comprise an account description.

The unclassified transaction data is input to a classification engine 110. The classification engine is configured to reference a classification rule 112 present in a ruleset or knowledge base 114.

Embodiments of multivariate approaches may employ more than one classification scheme to reach the final classification. Accordingly, FIG. 1B shows the classification engine in communication with a plurality of rules and rulesets/knowledge bases.

Based upon the multi-variable unclassified input and application of the appropriate rule(s), the classification engine is configured to output a relevant classification 116 for the transaction. A user 118 may access and review this classification. As described in detail below, according to certain embodiments the user may further provide feedback 120 to the classification engine in the form of a revision of the classification.

Figure 1C:
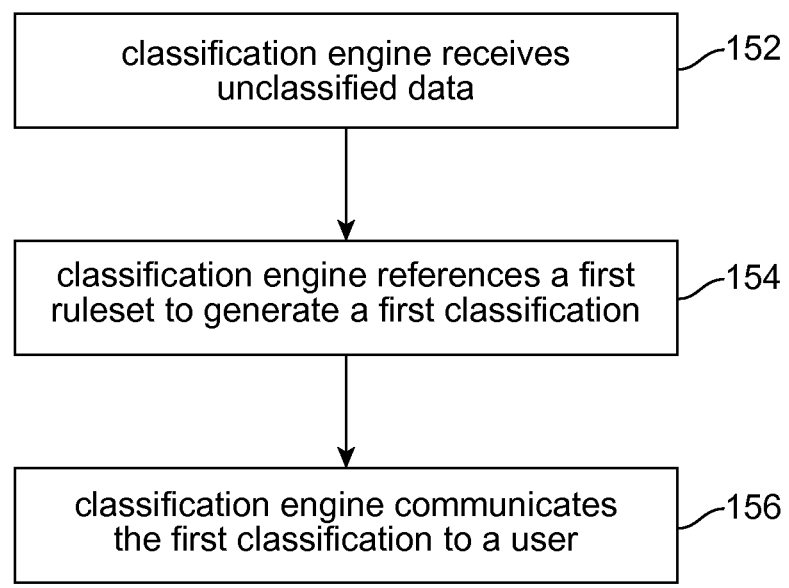
FIG. 1C is a simplified diagram showing a process flow according to an embodiment.

FIG. 1C is a simplified diagram showing a flow of a process 150 according to an embodiment. In a first step 152, a classification engine receives unclassified data comprising a first variable and a second variable of a purchase transaction. In a second step 154, the classification engine references a first ruleset to generate a first classification based upon the first variable, the second variable, and a rule of the first ruleset. In a third step 156, the classification engine communicates the first classification to a user.

The following provides a more detailed description of particular embodiments of multivariate transaction classification, particularly in the context of a purchasing transaction. However, embodiments are not limited to classifying this, or any other particular type of transaction.

As mentioned above, embodiments of multivariate approaches may employ one or more classification schemes alone or in combination. One possible classification scheme comprises statistical classification.

An embodiment of a statistical multivariate method comprises applying statistical rules to the transaction data, in order to calculate a confidence factor (CF) while assigning a precise classification code. The statistical rules may be pre-defined, and may be ranked according to reliability of the dimensions and confidence in a related industry domain.

Each rule may comprise a different combination of variables, e.g. as Supplier Name, Supplier Location, Supplier Line-of-Business, Account Description, Item Description, Category Description, Management Org, Buyer Description, Buying Org Description, Cost Center Description, Site etc.

The top ranked rule may use the most reliable and broadest set of dimensions across an industry, to accomplish an accurate match. Rules ranking below, may use fewer dimensions and/or exhibit a lower level of accuracy.

Rules for statistical classification schemes may be applied on historical transaction data, in order to select and group the records based on the matched dimensions and historical classification codes. The confidence factor may be calculated based on a count of records grouped on classification code, against the total number of records selected.

Confidence Factor=# of records grouped on classification code/# of matched records for that rule.

Figure 2A:
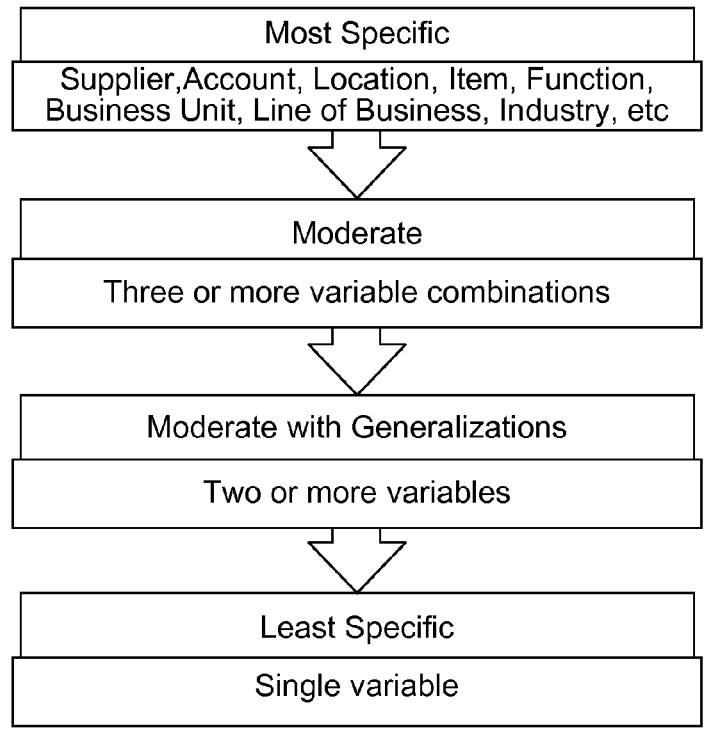
FIG. 2A shows a listing of sample statistical classification rules.

The group with highest confidence factor, is selected. Its corresponding classification code is applied to the non-classified transaction record. FIG. 2A shows a listing of sample statistical classification rules from most specific to least specific.

Statistical classification creates predictive rules based on historical transactions. Spend and transaction volume may be aggregated by these dimensions, with the outcome then ranked in descending order by absolute spend. The top outcome may be selected and a rule created.

In various embodiments, some rules may be filtered out as ambiguous or tending to result in over-fitting. Examples of such filtered rules may include but are not limited to:
- rules having too many outcomes for the same set of values;
- rules having only a few outcomes but evenly distributed transaction volume, indicating no clear dominant choice;
- rules where the top outcome is not classified;
- rules where the top outcome is associated with less than a given % of the total spend for that rule;
- rules where a particular value in the dimension is blank. For example, if the account description is blank/empty/null the rule may be removed so that blank account descriptions are not considered valid criteria. Missing values may be dealt with in other passes that ignore that particular dimension.

Semantic classification schemes may also be employed in transaction classification. Semantic classification may be based on a set of prescribed rules created by subject matter experts.

Semantic classification involves searching for key words and phrases in the certain descriptive dimensions of transaction data. In application, semantic classification may assign a precise classification code and pre-defined confidence factor to the transaction record.

Figure 2B:
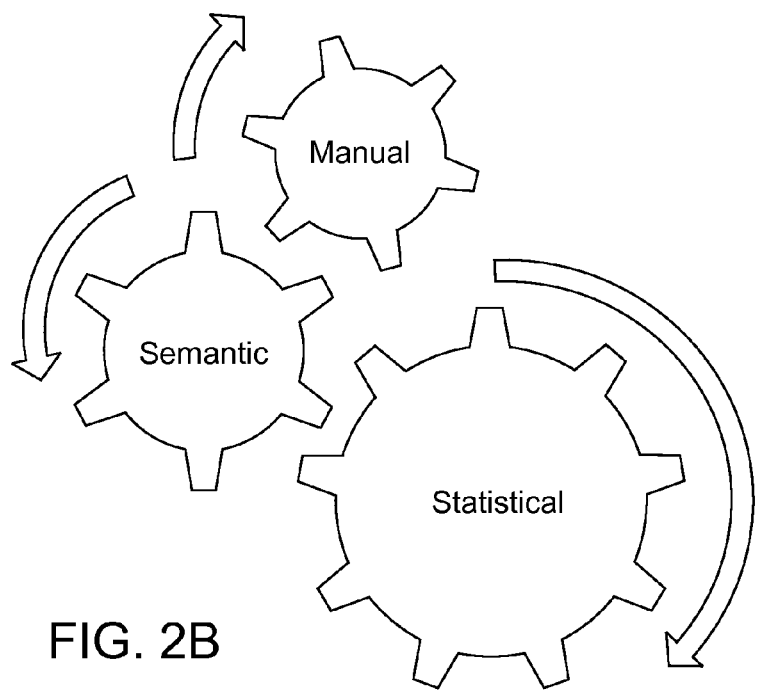
FIG. 2B schematically shows the roles of statistical, semantic, and manual approaches in transaction classification according to an embodiment.

Over time, semantic rules may diminish in value as customer history is accumulated and more accurate, statistically based outcomes are applied by statistical classification schemes. This is depicted in a highly simplified manner in FIG. 2B, with the role of manual review in transaction classification discussed in detail further below.

Semantic rules may be defined as a combination of: variables to be searched upon, the search key word, a pre-defined confidence factor, and a classification code to be assigned. The rules may be ranked based upon factors such as industry experience, and/or arrived reliability of dimensions across industry verticals to accomplish accuracy.

Semantic classification rules may be applied based upon current transaction data. The rule may require the key word search to be executed against the searchable dimensions. The search result records are updated with a pre-defined confidence factor and a classification code provided by rule.

Figure 2C:
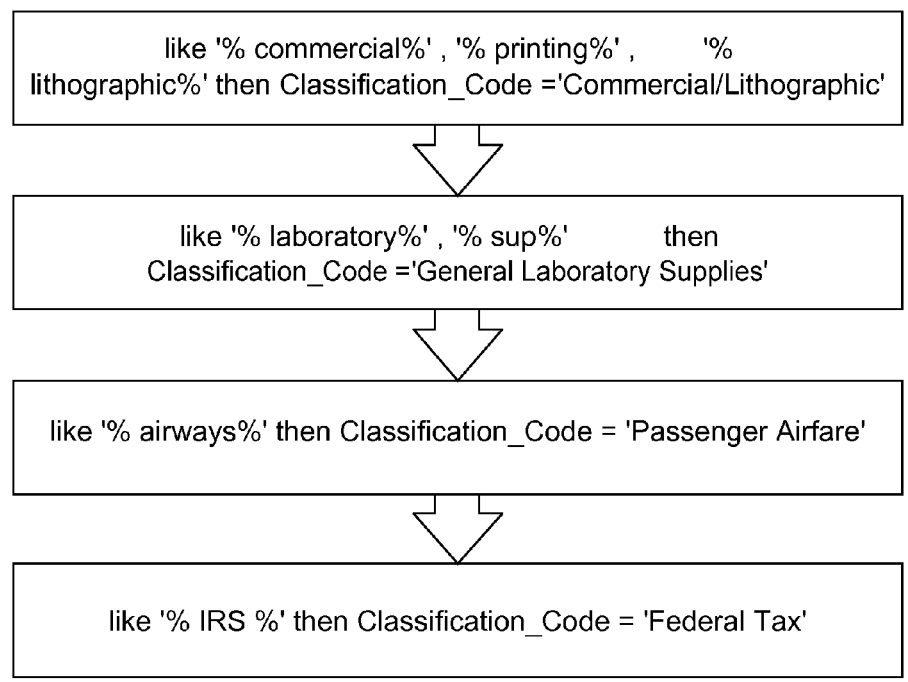
FIG. 2C shows a plurality of sample semantic classification rules.

To improve accuracy, semantic rules may be arranged in an execution sequence from most specific to least specific. FIG. 2C shows a plurality of sample semantic classification rules listed in order from most specific to least specific.

Semantic rules may be organized by pass based on historical experience. Some passes may relate to search criteria that are almost always unconditional like "taxes". Other passes may be less rigid. By identifying a pass, the success of semantic rules may be controlled and monitored.

Semantic rules may be organized based upon variable frequency. In particular, the fewer variables being searched, the more focused the rule. Therefore, the rule has a higher priority.

Semantic rules may be organized based upon criteria length. In particular, the longer the criteria, the more focused the rule. Therefore the rule has a higher priority.

Semantic rules may be organized based upon initial criteria. In particular, rules searching for variables beginning with specific criteria are more focused, and have higher priority. Under this scheme, leading spaces may be less valuable.

Semantic rules may be organized based upon sequence number. In particular embodiments, sequence number may serve as a tie breaker.

A system may have a set of semantic rules allowing searching for key words and phrases within specific variables. Such searches may serve as a starting point to supplement a multivariate method for initial classification of customer data. A set of evaluation rules driving the selection process can be fine-tuned by the system administrator.

Still another form of classification scheme which may be employed, is knowledge base classification. A knowledge base approach may be via a pre-defined set of rules.

In particular, knowledge base classification is similar to statistical classification, but the rule table is different. In particular, maintaining a large knowledge base of categorized transactions provides a strong basis for predicting classifications.

The majority of categorizations are at a second or third degree of granularity. For example, if a first degree of granularity describes a general market such as 'Transportation', then a second degree of granularity describes an industry such as 'Freight & Shipping', and a third degree of granularity describes the purchase such as 'Refrigerated Trucking' or 'Air Freight'.

Finer levels of granularity can be achieved depending upon the chosen taxonomy, and the quality of information provided on the spend transactions.

After the first cycle of classification and review, customer-specific knowledge exists that can be used as the basis for future predictions. Accordingly, the use of semantic rules may diminish over time, and the use of multivariate predictions increase.

According to embodiments, classification may proceed in two main phases: Training and Ongoing. Each phase may comprise a combination of statistical, semantic, Knowledge Base (KB) and manual revisions.

The first classification cycle is considered the 'Training' phase. For new customers, there may be no relevant customer history.

Accordingly, an industry knowledge base may be employed for initial KB classification. This knowledge base is an anonymous set of already-classified transactions, accumulated from past customers.

Additionally, pre-scripted rules created by subject matter experts, may be used for semantic classification. When a transaction is classified more than once, the best result may be automatically selected based upon factors such as technique, pass, and confidence factor.

Once the automated classification is complete, manual effort may be employed in reviewing the classified results—correcting and refining classifications as needed. Manual effort may also be used to code transactions that were not classified at all.

Such manual effort may be done by the processor.

Once the training phase is concluded, ongoing cycles use customer history as the major source in statistical classification. Statistical classification with the industry knowledge base and semantic classification rules may continue to be used, but with lesser emphasis. Accuracy and automation may improve with each cycle as historical content grows and feedback is incorporated.

EXAMPLE

Figure 3A:
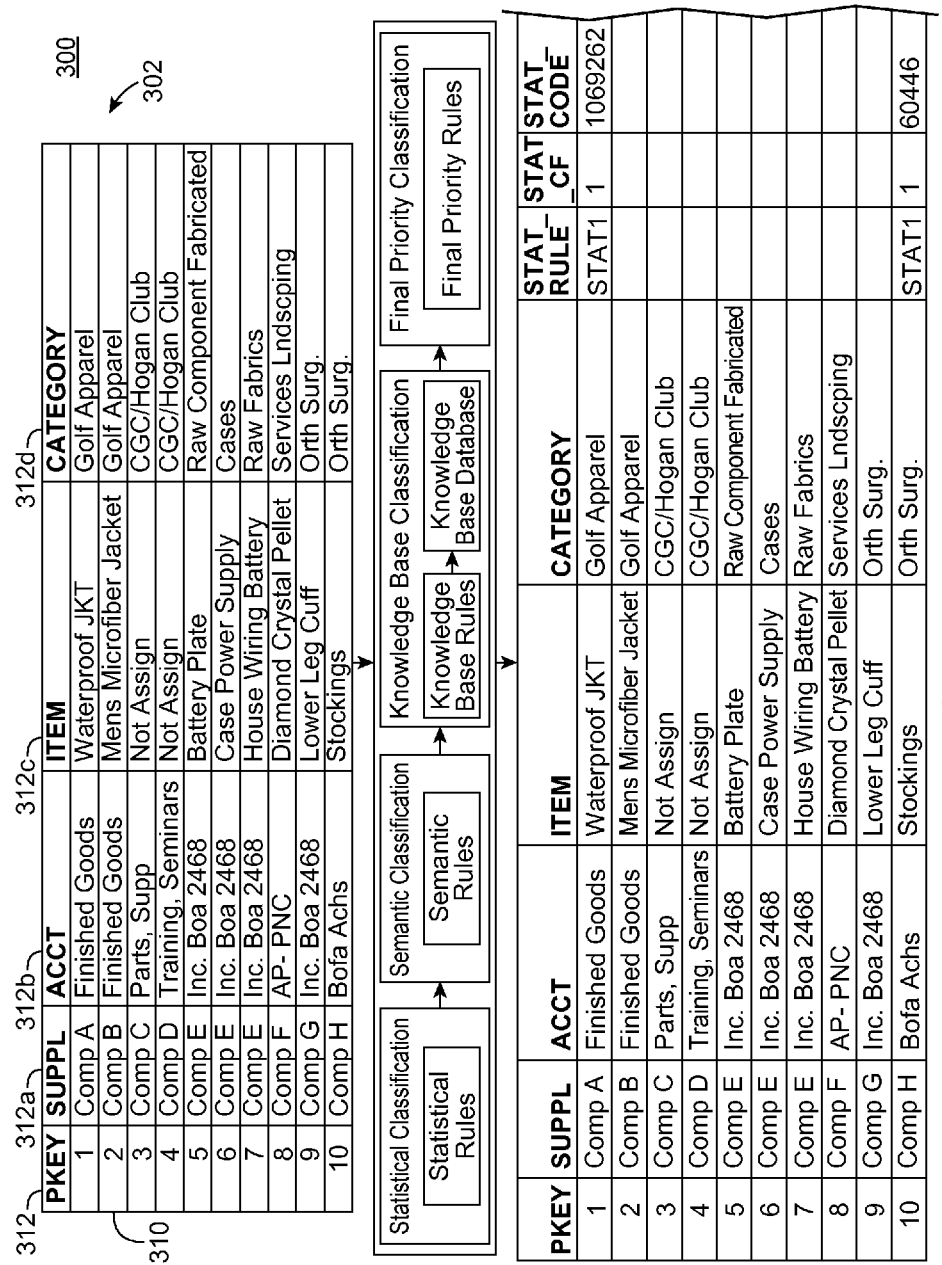
FIGS. 3AA-3AB are simplified diagrams showing one example of a multivariate classification process for a purchase transaction according to an embodiment.

FIGS. 3AA-AB are simplified diagrams showing one example of a multivariate classification process 300 for a purchase transaction according to an embodiment. Specifically, unclassified purchase transaction data 302 provided by a customer is available for processing according to the classification process.

FIG. 3AA shows in tabular form, the unclassified purchase data 300 provided by the user relating to purchase transactions. The data comprises rows 310 corresponding to different primary keys (PKEY), and columns 312 for four different variables of the purchase transaction: SUPPL (supplier) 312a, ACCT (account) 312b, ITEM 312c, and CATEGORY 312d.

Multivariate classification scheme can employ a plurality of schemes to accomplish classification. A first classification scheme is statistical classification.

The statistical classification works on historical data that has already been classified, of the same customer. The statistical rules applied to the data to achieve classification according to this scheme, have pre-defined priority based on industry experience.

FIG. 3B shows a ruleset for statistical classification. The statistical classification would classify the data based on an applied rule 313 from a ruleset 315. In particular, the statistical classification scheme would assign an appropriate statistical rule (STAT_RULE), statistical confidence factor (STAT_CF), and statistical code (STAT_CODE) to the transaction record (PKEY).

During an initial classification cycle, however, a customer may not have historical data. Accordingly the statistical classification scheme is not yet able to classify, and the STAT_RULE, STAT_CF, and STAT_CODE cells may be empty. During the next cycle and onwards, the statistical classification would be able to perform classification.

A second classification scheme is semantic classification. FIG. 3C shows a ruleset for semantic classification.

For example the priority of the semantic classification rule is calculated by the number of columns selected for the rule to be applied, and their confidence factor. In FIG. 3C the semantic classification rule Sem10 has the top priority, because it selects only one column and has the highest confidence factor (0.242) among rules which select all those four columns. The semantic classification rule Sem2 has the second priority, because it also selects all the four columns but has the second highest confidence factor (0.371) among the rules selecting all the four columns.

Here, the semantic classification applies pre-defined rules and confidence factor to the transaction data. For example the transaction record with PKEY=2, is categorized with SEM_CODE 1069262 and Confidence Factor 0.559 based upon the applied rule Sem1. The transaction record with PKEY=10, is categorized with SEM_CODE 81490 and Confidence Factor 0.371 based on applied rule Sem2.

A third classification scheme is knowledge base (KB) classification. The Knowledge Base (KB) Classification is similar to statistical classification.

FIG. 3DA shows a ruleset for knowledge base classification. As shown in FIG. 3DB, the KB classification works on the knowledge base database. The KB rules of that database have pre-defined priority based on industry experience.

Here, the KB classification would classify the data based on the applied rule 330 from the ruleset 382. The KB classification would assign the appropriate rule (KB_RULE), confidence factor (KB_CF), and code (KB_CODE) to the transaction record (PKEY).

The KB classification applies pre-defined rules and confidence factor from the KB database to the transaction data. For example rule KB1 is executed and the transaction record with PKEY=9 is matched against KB database record with PKEY=13. Hence the transaction record is categorized with KB1_CODE=60446 and Confidence Factor=1.

Now rule KB2 is executed and the transaction record with PKEY=8 is matched against KB database record with PKEY=12. Hence the transaction record is categorized with KB2 CODE=1066836 and Confidence Factor=0.567.

Now rule KB3 is executed, and transaction records with PKEY=1, 2, 3, 4, and 10 are matched against KB database records with PKEY=1, 2, 7, 8, and 14. Hence the transaction records are categorized with KB3_CODE=1069262, 1066187, 1066213, and 1069230, with Confidence Factor=0.957, 0.884, 1, and 1, respectively.

In a similar manner as has been described above, rule KB4 applies on all of the remaining transaction records that have not yet been classified.

A final classification is then determined based upon application of final rules. FIG. 3E shows a ruleset for final classification. Here, priority is denoted in a sequential manner.

The final rules have pre-defined priority based on industry experience. Final rules identify a best classification code among the statistical classification scheme, the semantic classification scheme, and the KB classification scheme.

Figure 4A:
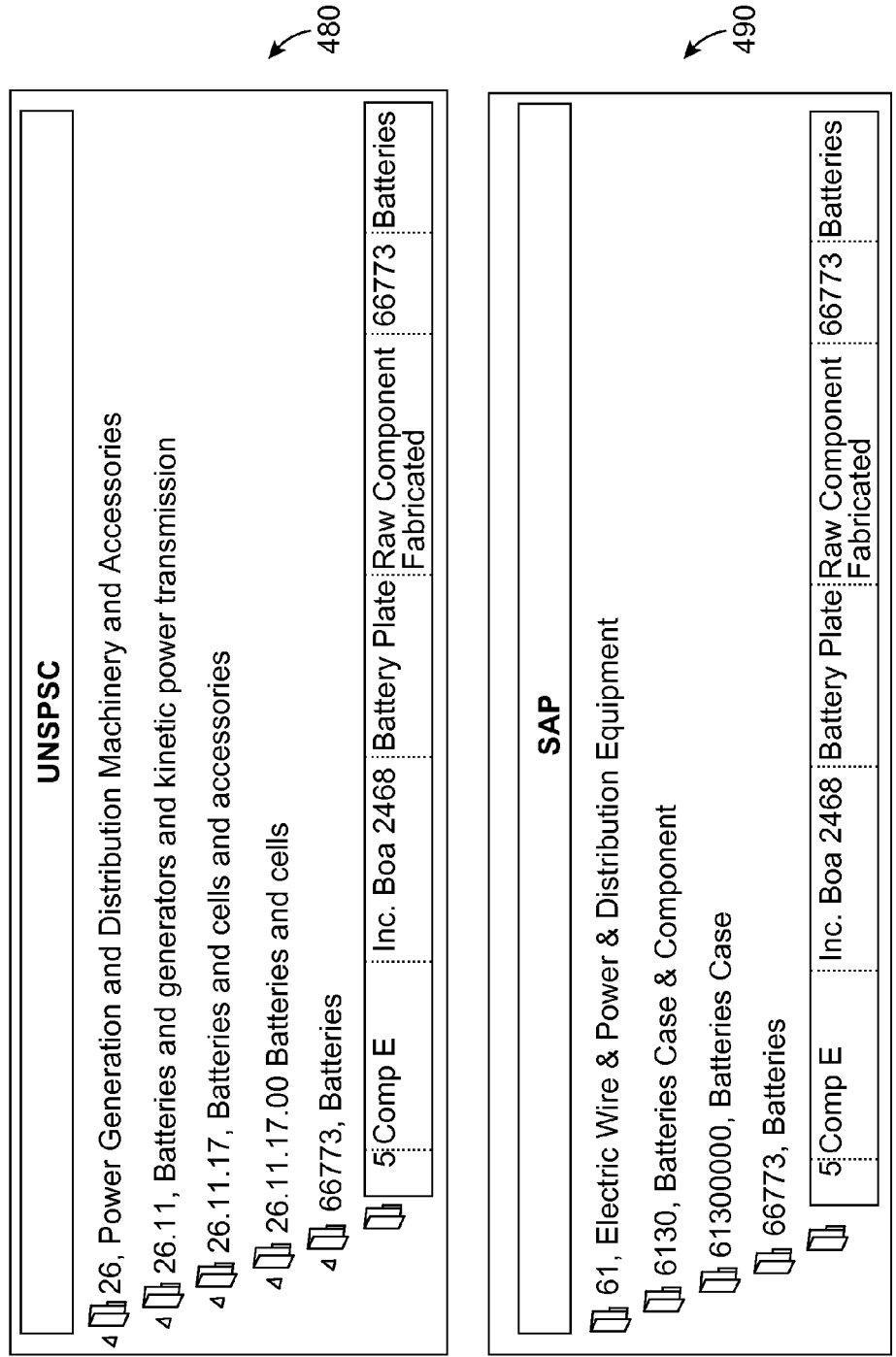
FIGS. 4AA-4AB show a classified transaction viewed in a hierarchical representation using data of a taxonomy table.

As shown in FIGS. 4AA-AB, classified transactions can be viewed in a hierarchical representation using the hierarchical data of a taxonomy table. A taxonomy is a hierarchical representation of classifications.

In the realm of spending analysis, there exist a number of available public and private (proprietary) taxonomies representing goods and services. An example of a public taxonomy is the UNSPSC, a portion of whose hierarchical structure is shown as 480 in FIG. 4AB. Other examples of public taxonomies for goods and services include but are not limited to: Common Procurement Vocabulary (CPV), Federal Supply Code (FSC), eC1@ss-products, materials and services along the entire supply chain, Standard Industrial Classification (SIC), North American Industry Classification System (NAICS), GPC-GS1 Global Product Classification, CSO/NACE—Central Statistics Office codes, and Harmonized Tariff System (HTS).

An example of a proprietary taxonomy for goods and services is the Data Enrichment and Classification (DEC) of the OnDemand™ software available from SAP AG of Walldorf, Germany. A portion of the hierarchical structure of the DEC taxonomy is shown as 490 in FIG. 4AB.

Embodiments may allow interchange between different taxonomies, so that a customer is not limited to just one. For example, DEC assigns a central classification code that cross-links to various taxonomies (including UNSPSC) in order for a customer to choose and perform analysis based upon a particular taxonomy. A single table including both a UNSPSC taxonomy and the SAP DEC taxonomy is shown as 492 in FIG. 4AA.

DEC has a set of semantic rules allowing searching for key words and phrases within specific variables. Such searches may serve as a starting point to supplement a multivariate method for initial classification of customer data. A set of evaluation rules driving the selection process can be fine-tuned by the DEC Administrator.

Once a final classification has been arrived at by the classification system, certain embodiments allow a user to review the classified data, and manually change the classification code if it is believed to be incorrect.

For example, in FIG. 3AA the PKEY1 transaction denotes purchase from SUPPLIER Company A of the ITEM Waterproof JKT under the ACCOUNT Finished Goods-Purchased and the CATEGORY Golf Apparel. The classification system erroneously classified this transaction as Water Service using the above classification process.

Based on the user's experience, however, he/she may change the classification to Sportswear/Athletic Clothing. If the another transaction having the same variables comes in the next classification cycle, then it will be classified as Sportswear/Athletic Clothing instead of Water Service according to the statistical classification scheme.

In another example shown in FIGS. 5AA-AB, the purchase transaction PKEY7 with the SUPPLIER Comp E for the ITEM House Wiring battery under the ACCT Inc. Boa 2468 with the CATEGORY Raw Fabrics, is initially classified as fabrics. This erroneous classification is later changed by the user to: Batteries. FIG. 5B shows a detailed view of the manual classification change of FIGS. 5AA-AB.

As mentioned previously, subsequent classification cycles may evolve to rely more heavily upon statistical classification schemes depending upon data from a particular customer, than upon semantic or knowledge base schemes depending upon more general and industry-wide data. This is illustrated in connection with FIGS. 6AA-AB, wherein a subsequent classification cycle is performed upon additional transactions represented by the unclassified data 600 (Load 2), where the transaction data from the initial cycle is Load 1.

FIG. 6 shows that the previously processed data of Load 1 will become historical data for the classification of the current unclassified input data of Load 2. Here the statistical classification scheme takes the rule one by one based upon priority from the rule table.

The statistical classification scheme compares the current unclassified data against the historical data using the columns in the rule, and assigns the classification code of the matched record of the historical data to the current data. If there is more than one match in the historical data, the statistical classification scheme calculates the confidence factor of each classification code in that matched group, selecting the classification code of the highest confidence factor.

For example, the transaction with PKEY=2 in the current unclassified data (Load 2), is matched against the transaction with PKEY 4 in the historical data, and there is only one match. So, the classification process assigns the classification code 60446 to the current transaction (PKEY=7).

Similarly, the transaction with PKEY=3 in current unclassified data (Load 2) is matched against the transactions with PKEY=1, 2, and 3 in the historical data, resulting in three matches. So, the classification process calculates the confidence factor for each classification code in that matched group.

In this case the confidence factor of the classification code 66773 is 0.66 (or 66%), and confidence factor for the classification code 1066356 is 0.33 (or 33%). As a result the classification process assigns the classification code 66773 to the current transaction (PKEY=6).

Figure 6A:
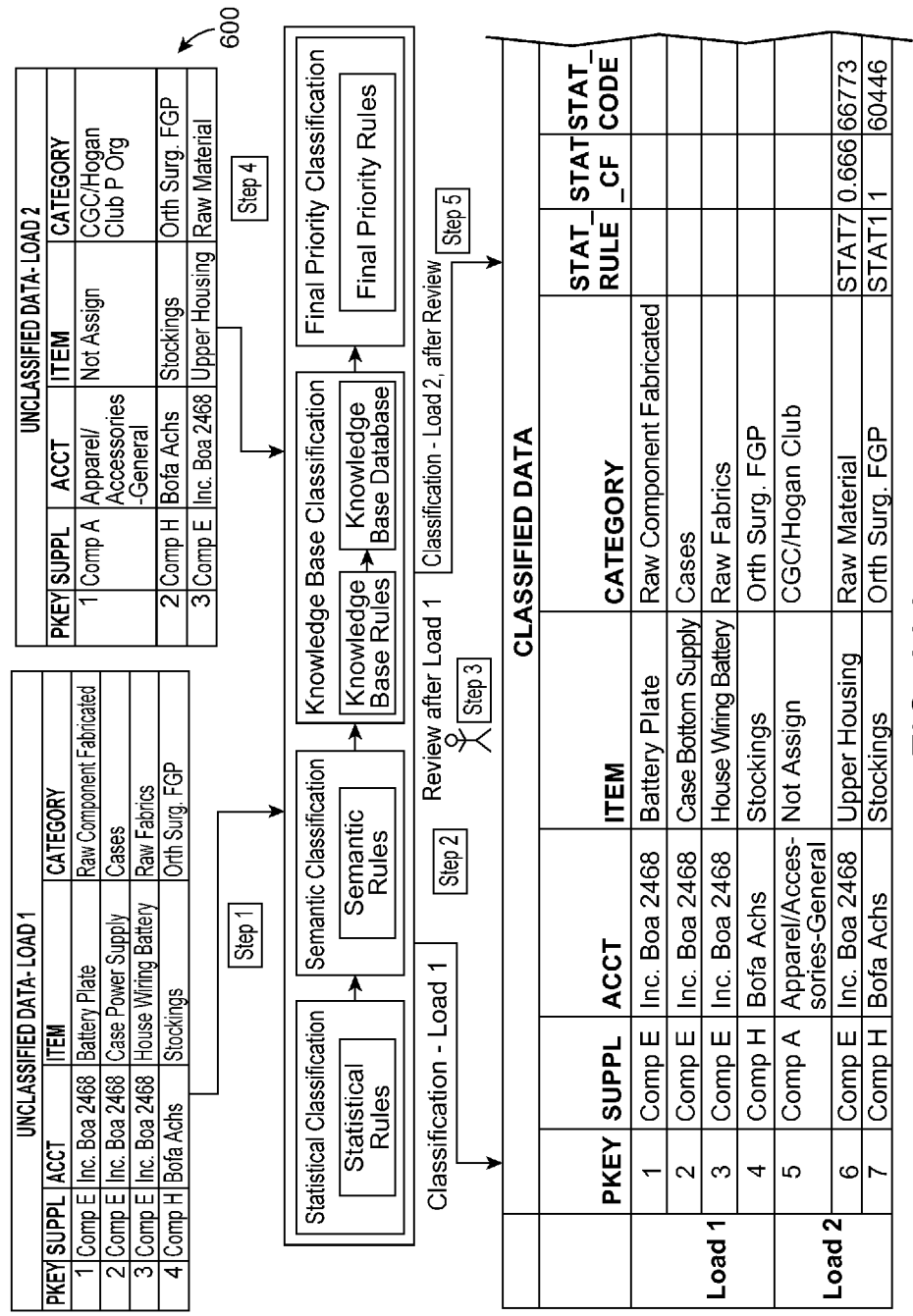
FIGS. 6AA-6AB show an example of a subsequent classification cycle.

Again, a plurality of classification schemes may be employed to classify the data of this Load 2. This is shown in FIGS. 6AA-AB for the application of semantic and KB classification.

As previously described in connection with the classification of the Load 1 data, a final classification is determined from amongst the outcomes of the various classification schemes. This is shown in FIGS. 6AA-AB.

Finally, optionally an ad-hoc manual review of the classified data by the user, may warrant changing the final classification as has been explained previously. For example in FIGS. 6AA-AB the Load 2 has erroneously classified the transaction 5 (PKEY=5) as Clothing, Individual Equip, rather than as Golf Club.

Subsequent cycles may involve classification of still additional data (e.g. Load 3), with statistical schemes enhanced by the results of classifying previous transactions.

Multivariate transaction classification according to various embodiments may offer enhanced granularity. FIGS. 7A-7D show the result of applying different classification approaches to a purchase transaction totaling $1,000,000.

In particular, FIG. 7A shows the result of classification according to the single variable of 'supplier'. This results in a breakdown between only two parts: Packaging and Telecom, offering a user relatively restricted visibility into spending.

FIG. 7B shows the result of classifying the same transaction according to a different single variable: 'item'. This results in a breakdown between only three parts: Cell Phones, Displays, and Unknown, the latter in particular providing a user with very limited visibility into spending.

FIG. 7C shows the result of classifying the same transaction according to yet another single variable: 'Account'. This results in a breakdown between five parts: Advertising, Freight, Unknown, Office Supplies, and Utilities. Again, however, the fact that nearly half of the amount spent is designated as Unknown, limits user visibility into spending.

The conventional single variable transaction classification approaches of FIGS. 7A-C, stand in marked contrast with an embodiment of multivariable classification as shown in FIG. 7D. There, the use of multiple variables for classifying the transaction, results in five parts, none of which are unknown.

Figure 8:
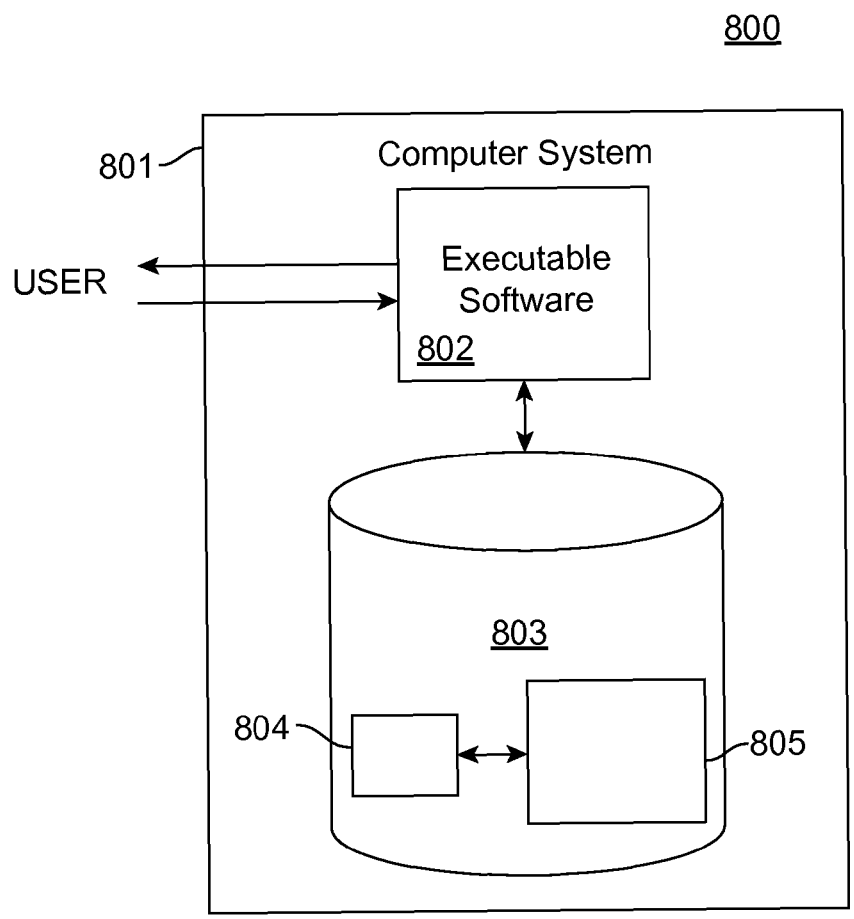
FIG. 8 illustrates hardware of a special purpose computing machine configured to perform transaction classification according to an embodiment.

FIG. 8 illustrates hardware of a special purpose computing machine configured to perform transaction classification according to an embodiment. In particular, computer system 800 comprises a processor 802 that is in electronic communication with a non-transitory computer-readable storage medium 803. This computer-readable storage medium has stored thereon code 805 corresponding to a classification engine. Code 804 corresponds to ruleset referenced by the classification engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 9:
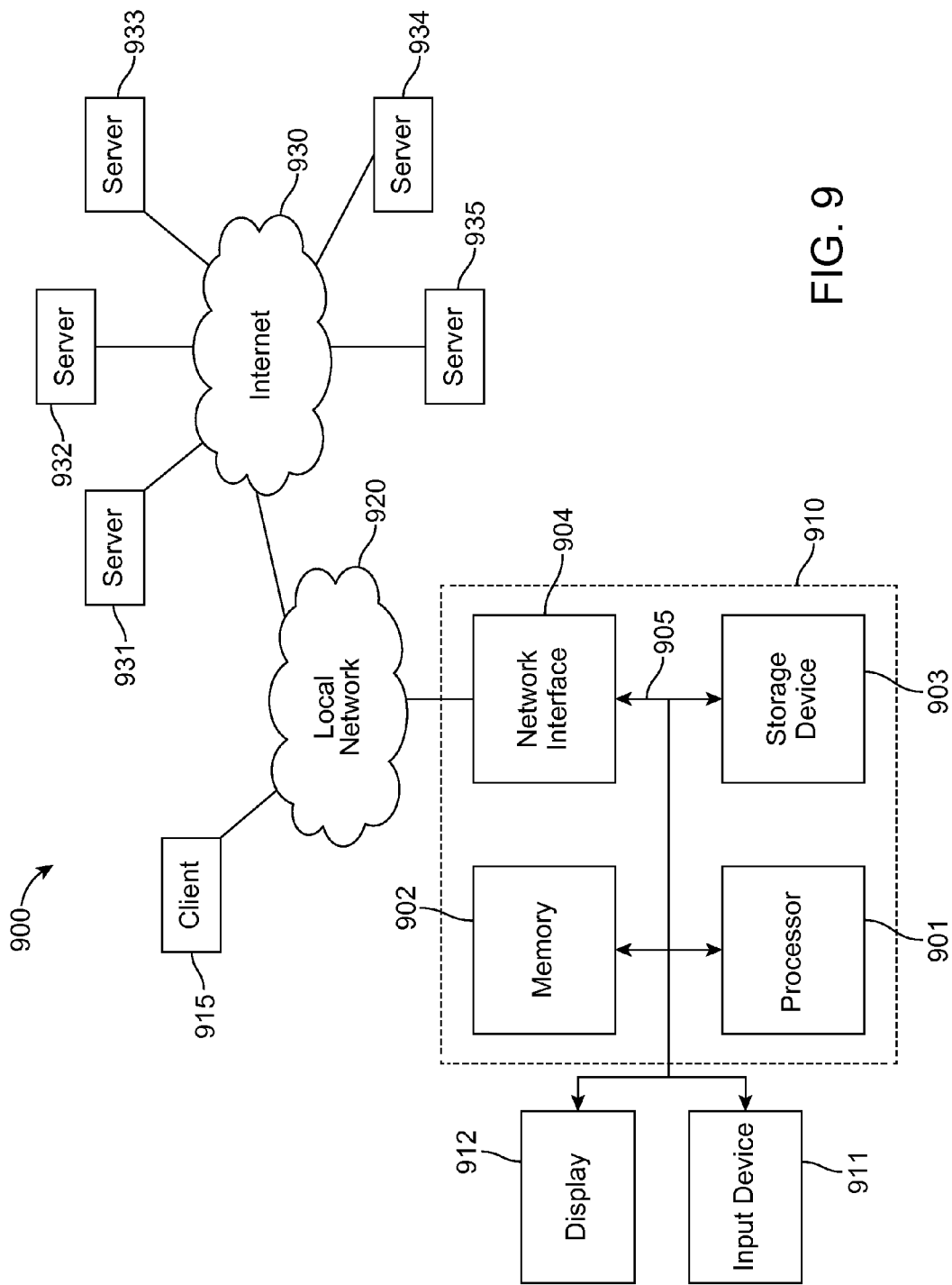
FIG. 9 illustrates an example of a computer system.

An example computer system 910 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
 causing a classification engine to receive unclassified data comprising a first variable and a second variable of a purchase transaction;
 causing the classification engine to reference a first ruleset reflecting a statistical classification scheme to generate a first classification based upon the first variable, the second variable, and a rule of the first ruleset; and
 causing the classification engine to communicate the first classification to a user,
 wherein the first ruleset further comprises a filtered rule selected from at least one of,
 a rule generating classifications exceeding a threshold;
 a rule generating classifications with a lack a dominant classification choice;
 a rule generating a top outcome that is not classified;
 a rule generating a top outcome associated with less than a percentage of a total spend;
 a rule for which a dimension value is blank.

2. A method as in claim 1 further comprising:
 causing the classification engine to reference a second ruleset to generate a second classification based on the first variable, the second variable, and a rule of the second ruleset; and
 causing the classification engine to determine that a confidence factor of the second classification is lower than a confidence factor of the first classification.

3. A method as in claim 1 wherein the first variable comprises buying location, source system, line of business, cost center, functional area, supplier capabilities, item description, account description, organization, or department.

4. A method as in claim 1 further comprising revising the first classification based upon feedback from review by the user.

5. A method as in claim 1 wherein the first classification is from a public taxonomy.

6. A non-transitory computer readable storage medium embodying a computer program for performing a method, said method comprising:
 causing a classification engine to receive unclassified data comprising a first variable and a second variable of a purchase transaction;
 causing the classification engine to reference a first ruleset reflecting a statistical classification scheme to generate a first classification based upon the first variable, the second variable, and a rule of the first ruleset; and
 causing the classification engine to communicate the first classification to a user,
 wherein the first ruleset further comprises a filtered rule selected from at least one of,
 a rule generating classifications exceeding a threshold;
 a rule generating classifications with a lack a dominant classification choice;
 a rule generating a top outcome that is not classified;
 a rule generating a top outcome associated with less than a percentage of a total spend;
 a rule for which a dimension value is blank.

7. A non-transitory computer readable storage medium as in claim 6 wherein the method further comprises
 causing the classification engine to reference a second ruleset to generate a second classification based on the first variable, the second variable, and a rule of the second ruleset; and
 causing the classification engine to determine that a confidence factor of the second classification is lower than a confidence factor of the first classification.

8. A non-transitory computer readable storage medium as in claim 6 wherein the first variable comprises buying location, source system, line of business, cost center, functional area, supplier capabilities, item description, account description, organization, or department.

9. A non-transitory computer readable storage medium as in claim 6 wherein the method further comprises revising the first classification based upon feedback from review by the user.

10. A non-transitory computer readable storage medium as in claim 6 wherein the first classification is from a public taxonomy.

11. A computer system comprising:
one or more processors;
a software program, executable on said computer system, the software program configured to:
cause a classification engine to receive unclassified data comprising a first variable and a second variable of a purchase transaction;
cause the classification engine to reference a first reflecting a statistical classification scheme to generate a first classification based upon the first variable, the second variable, and a rule of the first ruleset; and
cause the classification engine to communicate the first classification to a user,
wherein the first ruleset further comprises a filtered rule selected from at least one of,
a rule generating classifications exceeding a threshold;
a rule generating classifications with a lack a dominant classification choice;
a rule generating a top outcome that is not classified;
a rule generating a top outcome associated with less than a percentage of a total spend;
a rule for which a dimension value is blank.

12. A computer system as in claim 11 wherein the software program is further configured to:
cause the classification engine to reference a second ruleset to generate a second classification based on the first variable, the second variable, and a rule of the second ruleset; and
cause the classification engine to determine that a confidence factor of the second classification is lower than a confidence factor of the first classification.

13. A computer system as in claim 11 wherein the first variable comprises buying location, source system, line of business, cost center, functional area, supplier capabilities, item description, account description, organization, or department.

14. A computer system as in claim 11 wherein the software program is further configured to revise the first classification based upon feedback from review by the user.

* * * * *